United States Patent Office 3,847,977
Patented Nov. 12, 1974

3,847,977
PURIFICATION PROCESS FOR AROMATIC ACIDS
Richard V. Norton, Wilmington, Del., assignor to Sun Research and Development Co., Philadelphia, Pa.
No Drawing. Filed June 19, 1972, Ser. No. 263,809
Int. Cl. C07c 51/42, 63/36, 63/38
U.S. Cl. 260—525                        12 Claims

ABSTRACT OF THE DISCLOSURE

A process for purification of an aromatic acid such as isophthalic and terephthalic acid by extracting said impure acids with a three phase heterogeneous system consisting essentially of an aqueous extractant solution of acetic acid, a liquid aromatic hydrocarbon and aromatic acid, the aqueous acetic acid solution containing from about 40% to about 65% by weight of water, from about 15% to about 90% by weight of the aromatic acid being in the solid phase, and said extraction being made to occur in a closed system at a temperature of between about 200° and about 250° C.

---

Aromatic mono- and polycarboxylic acids are well known compounds and are used in a variety of applications, such as intermediates to dyes, polymers, and specialty chemicals. In many of these applications for the aromatic acids it is important to have high purity materials and acids with color bodies and/or nitrogen impurities must be avoided. This is particularly true wth terephthalic acid and isophthalic acids used respectively as polyester fiber and polyester resin intermediates.

A process for the purification of terephthalic acid has been disclosed in U.S. 3,624,145 (M. S. Brinn, issued Nov. 30, 1971, assigned to Du Pont) which is directed to removal of oxygen containing impurities such as p-tolualdehyde and p-formylbenzoic acid. In that disclosure a liquid-liquid extraction is carried out by contacting, under certain specific conditions, an aqueous solution of the crude acid with a water immiscible solvent, the most effective being xylene. In the preparation of aromatic acids by ammoxidation of alkyl-substituted aromatic hydrocarbons and subsequent hydrolysis of the nitriles formed, the product aromatic acids contain nitrogen bodies and are frequently off-color. Although the process of the above-mentioned U.S. 3,624,145 does effect reduction of nitrogen bodies in such nitrile derived acids, it is ineffective for removing the color bodies.

It has now been found, in accord with this invention, that the color of aromatic acids may be improved and the content of nitrogen impurities be reduced by extracting said impure acids with a three phase heterogeneous system consisting essentially of an aqueous extractant solution of acetic acid, a liquid aromatic hydrocarbon, and aromatic acid, the aqueous acetic acid solution containing from about 40% to about 65% by weight of water, the weight ratio of aqueous extractant solution to aromatic hydrocarbon being from about 3.75:1 to about 20:1, from about 15% to about 90% by weight of the aromatic acid being in the solid phase, and said extraction being made to occur in a closed system at a temperature of between about 200° and about 250° C.

The process of the invention is applicable to a wide variety of aromatic carboxylic acids and will include polyacids of the benzene series and mono- and polyacids of the naphthalene series. Examples of acids falling within these groups include phthalic acid, isophthalic acid, terephthalic acid, 1-naphthalene carboxylic acid, 2,6-naphthalene dicarboxylic acid, 1,5-naphthalene dicarboxylic acid, and the like. Preferably the process will be used with isophthalic and terephthalic acids and when these are obtained by ammoxidation of the meta- or p-xylene by ammoxidation, the process will be most beneficial. Other acids useful in the process are those set out above having inert ring substituents such as halogen, nitro, lower alkyl, lower alkoxy and the like. Preferably, however, the aromatic ring will be hydrocarbon except for the carboxy acid substituent.

The hydrocarbon solvents useful in the process will be a water immiscible liquid organic compound inert to both the aromatic acid and to acetic acid and will preferably be an aromatic hydrocarbon having from six to nine carbon toms. Preferred solvents will be benzene, toluene, the xylene isomers and their mixtures, and the like. The most preferred solvents are toluene and xylenes.

A number of parameters in the process of this invention are important in order to make the process most effective. First of all, a heterogeneous three phase system must be used; e.g., a system consisting essentially of an aqueous acetic acid solution, a liquid aromatic hydrocarbon, and a solid phase of the aromatic carboxylic acid being purified. The aqueous acetic acid solution will have from about 40% to about 65% (by weight) of water, preferably about 50%. The weight ratio of aqueous extractant (i.e., water and acetic acid) to aromatic hydrocarbon will be between about 3.75:1 to about 20:1, with about 5:1 to about 10:1 being preferred. And, finally, from about 15% to about 90% by weight (preferably from about 80% to 85%) of solid aromatic acid used in the process will be in the solid state. It will be understood that the amount of solid phase aromatic acid present will be determined by the solubility of the acid in the solvent at the particular temperature employed. Tables I and II which follow are guides as to the approximate minimum and maximum amounts of aromatic acid to be used at various maximum temperatures with the preferred concentration of aqueous acetic acid solution.

TABLE I

Minimum Amounts of Crude Aromatic Carboxylic Acid To Be Used at Various Extraction Temperatures Using 50% Aqueous Solution of Acetic Acid

| Maximum Extraction Temperature (° C.) | Grams of Aromatic Acid Per Kg. Aqueous Acetic Acid |
|---|---|
| 180 | 16 |
| 200 | 37 |
| 220 | 55 |
| 240 | 90 |

When an amount of aromatic acid less than that set out in the above table is used, there is either no solid phase present or an insufficient amount of solid to make the process operable.

TABLE II

Maximum Amounts of Crude Aromatic Carboxylic Acid To Be Used at Various Extraction Temperatures Using 50% Aqueous Solution of Acetic Acid

| Maximum Extraction Temperature (° C.) | Grams of Aromatic Acid Per Kg. Aqueous Acetic Acid |
|---|---|
| 180 | 60 |
| 200 | 150 |
| 220 | 250 |
| 240 | 400 |

When an amount of aromatic acid more than that set out above is used, purification of the carboxylic acid is not significant because the amount of solid phase exceeds 90%.

In order to further illustrate the process of the invention the following examples are given:

General Procedure

Crude terephthalic acid (TPA), isophthalic acid (IPA), or 2,6-naphthalene dicarboxylic acid (2,6-NDCA) prepared by hydrolysis of the corresponding dinitrile was slurried into a solution of acetic acid and water. Xylene (m- for IPA and 2,6-NDCA, p- for TPA) or toluene was added and the stirred titanium autoclave used in the process was sealed.

The system was heated at the temperatures shown for 1.5 hours, cooled to 100° C. and the autoclave opened. The hydrocarbon solvent was decanted from the top of the slurry and the crystals isolated by filtration at 100° C. from the aqueous acetic acid layer. The purified TPA and IPA was dried at 120° C. and analyzed for nitrogen content and APHA color.

Table III lists details of the experimental conditions and the effect upon IPA or TPA purity.

23 and 24). Examples 25 to 28 illustrate the process with acids other than TPA.

In view of the above it is clear that the process of the invention makes a valuable contribution to the art of aromatic acid purification.

The invention claimed is:

1. A process for purification of an aromatic acid containing color and nitrogen impurities selected from the group of poly acids of the benzene series and mono- and poly acids of the naphthalene series and obtained by the hydrolysis of nitriles, which comprises extracting said impure acid with a three phase heterogeneous system consisting essentially of an aqueous solution of acetic acid, a liquid aromatic hydrocarbon having from six to nine carbon atoms, and aromatic acid; the aqueous acetic acid solution containing from about 40% to about 65% by weight of water, the weight ratio of aqueous extractant solution to aromatic hydrocarbon being from about 3.75:1 to about 20:1, from about 15% to about 90% by weight of the aromatic acid being in the solid phase, and said ex-

TABLE III

| Example number | Crude acid | | | Purification conditions | | | | | | Purified acid | |
|---|---|---|---|---|---|---|---|---|---|---|---|
| | Gm. | APHA color | Percent N | $H_2O$ (g.) | $CH_3COOH$ (g.) | Xylene (g.) | Toluene (g.) | Temp., °C. | Wt. percent acid in solid phase | Percent N | APHA color |
| Terephthalic acid: | | | | | | | | | | | |
| 1 | 170 | 50 | 4.71 | 500 | 500 | 0 | 0 | 200 | 82 | 0.60 | 60-70 |
| 2 | 170 | 60 | 2.13 | 500 | 500 | 0 | 0 | 200 | 82 | 0.30 | 90-100 |
| 3 | 170 | 60 | 4.71 | 500 | 0 | 150 | 0 | 200 | 94 | 0.47 | 60-70 |
| 4 | 150 | 50 | 4.65 | 500 | 0 | 100 | 0 | 225 | 86 | 0.48 | 70-80 |
| 5 | 170 | 60 | 4.71 | 500 | 0 | 0 | 0 | 250 | 82 | 0.41 | 60-70 |
| 6 | 170 | 50 | 4.71 | 500 | 500 | 150 | 0 | 200 | 82 | .045 | 30-35 |
| 7 | 170 | 50 | 4.71 | 500 | 500 | 0 | 150 | 200 | 82 | 0.49 | 30-40 |
| 8 | 170 | 60 | 2.13 | 500 | 500 | 100 | 0 | 200 | 82 | 0.10 | 30-40 |
| 9 | 170 | 60 | 2.13 | 500 | 500 | 50 | 0 | 200 | 82 | 0.21 | 40-50 |
| 10 | 170 | 60 | 2.13 | 500 | 500 | 0 | 100 | 200 | 82 | .009 | 30-40 |
| 11 | 130 | 60-70 | 3.75 | 500 | 500 | 150 | 0 | 150 | 97 | 2.15 | 50-60 |
| 12 | 130 | 60-70 | 3.75 | 500 | 500 | 150 | 0 | 200 | 77 | 0.49 | 30-40 |
| 13 | 130 | 60-70 | 3.75 | 500 | 500 | 150 | 0 | 230 | 31 | 0.27 | 30 |
| 14 | 130 | 60-70 | 3.75 | 500 | 500 | 150 | 0 | 300 | 0 | 0.38 | 60 |
| 15 | 128 | 60-70 | 5.13 | 375 | 375 | 0 | 0 | 150 | 98 | 1.75 | 60-70 |
| 16 | 128 | 60-70 | 5.13 | 375 | 375 | 0 | 0 | 250 | 23 | .055 | 90-100 |
| 17 | 128 | 60-70 | 5.13 | 375 | 375 | 100 | 0 | 200 | 82 | .053 | 30-40 |
| 18 | 128 | 6-70 | 5.34 | 375 | 375 | 150 | 0 | 200 | 82 | .045 | 30-40 |
| 19 | 128 | 60-70 | 5.34 | 375 | 375 | 200 | 0 | 200 | 82 | .044 | 25-30 |
| 20 | 128 | 60-70 | 5.34 | 375 | 375 | 0 | 200 | 200 | 82 | .047 | 25-30 |
| 21 | 128 | 60-70 | 5.34 | 375 | 375 | (Note 1) | | 200 | 82 | 0.04 | 30 |
| 22 | 128 | 60-70 | 5.34 | 100 | 650 | 200 | 0 | 200 | 88 | 1.75 | 60-70 |
| 23 | 128 | 70-80 | 4.34 | 400 | 600 | 100 | 0 | 250 | 85 | 0.53 | 30-40 |
| 24 | 171 | 70-80 | 4.34 | 650 | 350 | 100 | 0 | 250 | 18 | 0.64 | 40-50 |
| Isophthalic acid: | | | | | | | | | | | |
| 25 | 128 | 100 | 3.17 | 375 | 375 | 0 | 0 | 200 | 82 | 1.34 | 120 |
| 26 | 128 | 100 | 3.17 | 375 | 375 | 150 | 0 | 200 | 82 | .065 | 80 |
| 27 | 128 | 100 | 3.17 | 375 | 375 | 200 | 0 | 200 | 82 | .040 | 70 |
| 2,6-naphthalene dicarboxylic acid: 28 | 128 | 90-100 | 3.78 | 500 | 500 | 200 | 0 | 250 | 41 | .150 | 55-60 |

NOTE 1.—150 g. benzene used as liquid aromatic hydrocarbon.

Consideration of the above data indicates the effectiveness of the process and the required parameters for its successful operation. Thus, Examples 1 and 2 show that the use of the aqueous acetic acid solution alone is not effective for improving the APHA color, although the aqueous acetic acid hydrolysis does reduce nitrogen content. Likewise, Examples 3 and 4 show that xylene or toluene extraction without acetic acid is not effective in improving color. Example 5 shows that a water extraction alone is also of no value for improving color of the aromatic acid. However, when aqueous acetic acid plus the aromatic hydrocarbon solvent is used, both color and nitrogen are significantly reduced (Examples 6 to 10). It is also clear from Examples 11 and 14 that when 97% of the aromatic acid is in the solid phase (Example 11) purification and color reduction is insignificant and the same holds true when none of the aromatic acid is in the solid phase (Example 14), the system being homogeneous. Examples 15 to 21 further illustrate the need for the parameters of the invention. Also, it is seen from Example 22, that no color reduction is achieved nor is nitrogen content effectively removed when the acetic acid contained only 13.3% $H_2O$; but 50% aqueous acetic acid under the same conditions gave purified TPA (Example 19) and also 40% and 65% water in the acetic acid is effective (Examples traction being made to occur in a closed system at a temperature of between about 200° and about 250° C.

2. The process of Claim 1 where the acid is isophthalic acid.

3. The process of Claim 1 where the acid is isophthalic acid and the aromatic hydrocarbon is xylene.

4. The process of Claim 1 where the acid is terephthalic acid.

5. The process of claim 4 where the aromatic hydrocarbon is benzene.

6. The process of Claim 4 where the aromatic hydrocarbon is toluene.

7. The process of Claim 4 where the aromatic hydrocarbon is xylene.

8. The process of Claim 1 where the acid is 2,6-naphthalene dicarboxylic acid.

9. The process of Claim 8 where the aromatic hydrocarbon is xylene.

10. The process of Claim 1 where the acid is isophthalic acid, the aromatic hydrocarbon is m-xylene, the aqueous extractant solution contains about 50% by weight of water, the weight ratio of aqueous extractant solution to m-xylene is from about 3.75 to about 7.5, and from about 80% to about 85% by weight of the isophthalic acid is in the solid phase.

11. The process of Claim 1 where the acid is terephthalic acid, the aromatic hydrocarbon is benzene, toluene, or p-xylene, the aqueous extract solution contains from about 50% to about 65% by weight of water, the weight ratio of aqueous extractant solution to aromatic hydrocarbon is from about 5:1 to about 10:1, and from about 80% to about 85% by weight of the terephthalic acid is in the solid phase.

12. The process of Claim 1 where the acid is 2,6-naphthalene dicarboxylic acid, the aromatic hydrocarbon is m-xylene, the aqueous extractant solution contains about 50% by weight of water, and the weight ratio of aqueous extractant to m-xylene is about 5:1.

References Cited
UNITED STATES PATENTS

| | | | |
|---|---|---|---|
| 3,654,350 | 4/1972 | Witt et al. | 260—525 |
| 3,624,145 | 11/1971 | Brinn | 260—525 |

LORRAINE A. WEINBERGER, Primary Examiner

R. D. KELLY, Assistant Examiner